Sept. 6, 1938.  W. F. LELAND  2,129,095
HANDLE
Filed Dec. 3, 1937
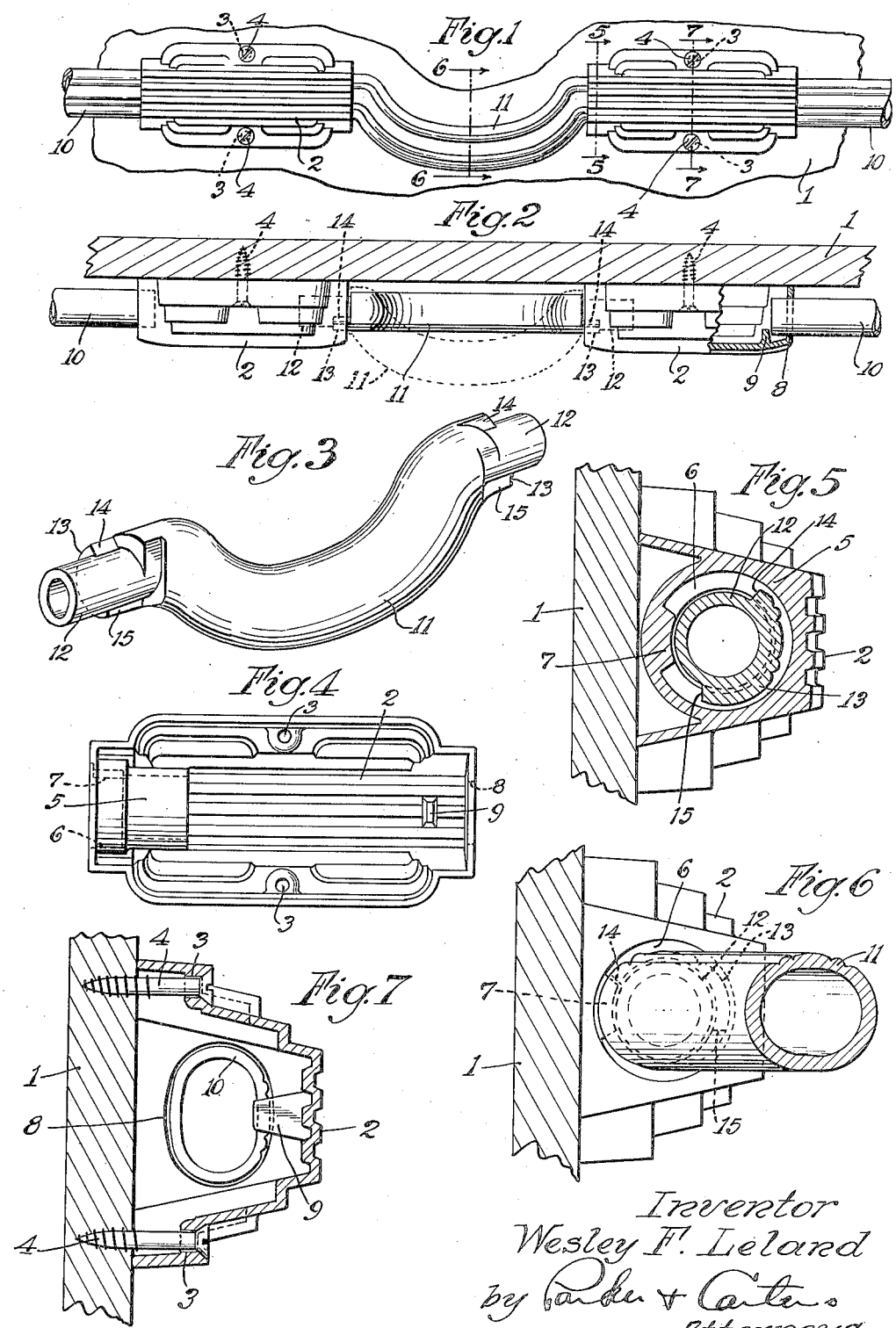
Inventor
Wesley F. Leland
by Carter & Carter
Attorneys.

Patented Sept. 6, 1938

2,129,095

UNITED STATES PATENT OFFICE 2,129,095

HANDLE

Wesley F. Leland, Elgin, Ill., assignor to Western Casket Hardware Company, Elgin, Ill., a corporation of Illinois Application December 3, 1937, Serial No. 177,949

3 Claims. (Cl. 16—112)

This invention relates to a handle and has for one object to provide a support for a movable handle element which combines the functions of supporting and limiting the movement of the handle.

Another object is to provide in a device of the sort indicated a support for a movable handle which at the same time serves as a support for immovable handle elements.

Other objects will appear from time to time in the course of the specification and claims.

The invention is illustrated more or less diagrammatically in the accompanying drawing, wherein:

Figure 1 is a side elevation of the handle and support;

Figure 2 is a horizontal section through the device upon which the handle is mounted showing the handle in plan and with parts of the support broken away and parts in section;

Figure 3 illustrates the handle separated from its support in perspective;

Figure 4 is an inside plan view of the handle support;

Figure 5 is a transverse section taken at line 5—5 of Figure 1 on an enlarged scale;

Figure 6 is a transverse sectional detail taken at line 6—6 of Figure 1 on an enlarged scale and illustrating parts in section and parts in elevation; and Figure 7 is a transverse sectional detail taken at line 7—7 of Figure 1 on an enlarged scale.

Like parts are designated by like symbols throughout the specification and drawing.

I indicates a box or container upon which the handle and handle supports are mounted. As shown, the handle comprises two supports between which is mounted a movable element and each of the supports carries a fixed element.

The handle support comprises a generally hollow member 2 which may be given any desired ornamental design. It is provided with a pair of perforations 3, 3 adapted to receive attachments 4, 4 by means of which it is secured to the member 1. As shown, the attachments are in the form of screws but any other attachment might be used.

The supports are preferably used in pairs with the movable handle member mounted between them and supported at each end in one of them. As shown, that portion of the support which carries the movable handle is a generally rounded member or section 5. Its interior may be generally cylindrical and it is enlarged as at 6 and an inwardly projecting lug 7 is positioned in the enlarged portion. At its opposite end the support member is provided with a hole 8 which may be round or, as in the particular form here shown, more or less elliptical. An inwardly projecting lug 9 is formed in the member 2 and preferably extends into the margin of the hollow perforation 8. A fixed handle section 10 is received in the hole 8 of one or both of the support members.

Between two support members a movable handle 11 is mounted for movement. As shown, this handle 11 may be bent and when in the inactive or lowered position it lies as shown in Figure 1. When in the active or raised position, it lies as shown in Figure 6. For purposes of lightness it may be made hollow as shown in Figure 6, but may be solid. At each end the handle member is preferably provided with a round or cylindrical section 12, 12 to be received in the portion 5. Formed about the generally rounded portion 12 is an enlargement 13 terminating in a pair of stop faces 14, 15. These stop faces are arranged to cooperate with the lug 7. Thus when the handle is raised as shown in Figure 6 the stop face 14 contacts the upper face of the lug 7 and limits the upward movement of the handle by reason of that contact. When the handle is not raised it may depend downwardly freely and its inward movement is limited by the contact of the stop face 15 against the lower face of the lug 7. As here shown, the shape and the relationship of the handle with respect to the member 1 upon which it is mounted is such that the handle portion 11 would contact the member 1 before it swings downwardly and inwardly sufficiently to bring the stop face 15 in contact with the lower face of the lug 7. If otherwise mounted, this contact might occur, and it is to prevent excessive inward and downward swinging of the handle section 11 that this provision is made.

It will be realized that whereas I have herewith shown and described a practical operative device, nevertheless many changes might be made in the size, shape, number and disposition of parts without departing from the spirit of this invention, and I wish, therefore, that my showing be taken as in a sense diagrammatic.

The use and operation of the invention are as follows:

When the device is to be used, two support members are secured to a container or to any other article upon which it is desired to mount the handle. Between the two support members one swinging handle section is mounted as shown in the drawing. When not in use, if the handle is positioned on a generally vertical member, the handle section 11 will swing downwardly, as shown in Figure 1, under the influence of gravity and will remain in that position. When it is raised it swings to the position generally shown in Figure 6 and its upward movement is limited to that position by the contact of the stop face 14 with the lug 7.

If it is desired to continue the general effect illustrated, one or more fixed handle sections 10 are used, being secured at one or both ends in the hole 8 at the end of the supporting member opposite to that which receives the swinging handle 11. The opposite end of the handle member 10 might be secured in another such support member or might be secured in any desired manner. Frequently several pairs of supporting members will be used and between each pair a hinged handle section is mounted, and between such pairs of supports fixed handle sections run so that a swinging handle section alternates with a fixed handle section. The assembly as a whole may terminate at one of the supporting members or if desired a fixed handle section may extend from the outermost or end support and be carried at its end in any desired manner.

I claim:

1. In combination in a handle, a plurality of support members adapted to be fixedly secured to a base, each support comprising a member having a generally cylindrical cavity within it, said cavity formed with two portions of different internal diameter, an inwardly projecting lug formed in one of said cavity portions, and a movable handle element mounted with an end in each of two adjacent supports, said handle member terminating in a pair of rounded ends, each adapted to penetrate into one of said supports and to lie within said cavity and carrying adjacent each of said rounded portions a lug adapted to contact the said lug within said cavity, the swinging movement of said handle being limited by said contact.

2. In combination in a handle, a plurality of support members adapted to be fixedly secured to a base, each support comprising a member having a generally cylindrical cavity within it, said cavity formed with two portions of different internal diameter, an inwardly projecting lug formed in the larger of said cavity portions, and a movable handle element mounted with an end in each of two adjacent supports, said handle member terminating in a pair of rounded ends, each adapted to penetrate into one of said supports and to lie within said cavity and carrying adjacent each of said rounded portions a lug adapted to contact the said lug within said cavity, the swinging movement of said handle being limited by said contact.

3. In combination in a handle, a plurality of support members adapted to be fixedly secured to a base, each support comprising a member having a generally rounded cavity within it, said cavity formed with two portions of different internal diameter, an inwardly projecting lug formed in the larger of said cavity portions, and a movable handle element mounted with an end in each of two adjacent supports, said handle member terminating in a pair of rounded ends, each adapted to penetrate into one of said supports and to lie within said cavity largely within the smaller of said cavity portions and carrying adjacent each of said rounded portions a lug adapted to lie within said cavity portion of said larger diameter and to contact the said lug within said cavity, the swinging movement of said handle being limited by said contact.

WESLEY F. LELAND.